US012650688B2

(12) United States Patent
Mori et al.

(10) Patent No.: US 12,650,688 B2
(45) Date of Patent: Jun. 9, 2026

(54) REMOTE ASSISTANCE APPARATUS, METHOD, AND PROGRAM

(71) Applicant: DENSO CORPORATION, Kariya-city (JP)

(72) Inventors: Takuya Mori, Kariya-city (JP); Kengo Sasaki, Kariya-city (JP); Toru Nagura, Kariya-city (JP); Satoshi Yoshinaga, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 295 days.

(21) Appl. No.: 17/656,843

(22) Filed: Mar. 28, 2022

(65) Prior Publication Data

US 2022/0221855 A1     Jul. 14, 2022

Related U.S. Application Data

(63) Continuation of application No. PCT/JP2020/028745, filed on Jul. 27, 2020.

(30) Foreign Application Priority Data

Sep. 30, 2019    (JP) ................................. 2019-178934

(51) Int. Cl.
    *G05D 1/00*        (2024.01)
    *B60W 60/00*       (2020.01)
(52) U.S. Cl.
    CPC ....... *G05D 1/0016* (2013.01); *B60W 60/0011* (2020.02); *G05D 1/0276* (2013.01); *B60W 2556/45* (2020.02)

(58) Field of Classification Search
    CPC .. G05D 1/0016; G05D 1/0276; G05D 1/0011; B60W 60/0011; B60W 2556/45;
    (Continued)

(56) References Cited

U.S. PATENT DOCUMENTS

2017/0255195 A1    9/2017  Mabuchi
2019/0210601 A1*   7/2019  Kojima .................. G07C 5/085
                            (Continued)

FOREIGN PATENT DOCUMENTS

JP      2010-286277 A    12/2010
JP      2016-215751 A    12/2016
                (Continued)

*Primary Examiner* — Helal A Algahaim
*Assistant Examiner* — Shien Ming Chou
(74) *Attorney, Agent, or Firm* — Precision Patents, P.C.

(57)         ABSTRACT

A remote assistance apparatus records, in an assistance content recording unit, assistance contents for remote assistance for an autonomous driving vehicle in response to the autonomous driving vehicle stopping as a result of an occurrence of a traveling abnormality, and then resumes autonomous traveling as a result of remote assistance for the autonomous driving vehicle being provided by an operator. The assistance contents include an assistance location and operator instruction contents for remote assistance instructed by the operator. The remote assistance apparatus detects an autonomous driving vehicle that is expected to pass through a predetermined assistance location included in predetermined assistance contents recorded in the assistance content recording unit. The remote assistance apparatus determines an assistance method of the remote assistance for the autonomous driving vehicle that is detected by the assisted vehicle detecting unit, based on the predetermined assistance contents that are recorded in the assistance content recording unit.

8 Claims, 4 Drawing Sheets

(58) Field of Classification Search
CPC .......... B60W 60/0025; B60W 60/0053; G01C
21/34; G08G 1/09; G08G 1/123
USPC ........................................................ 701/2
See application file for complete search history.

(56) References Cited

U.S. PATENT DOCUMENTS

| | | | |
|---|---|---|---|
| 2020/0200553 A1* | 6/2020 | Voznesensky | ........ B60W 40/06 |
| 2020/0239023 A1* | 7/2020 | Srinivasan | ............. G05D 1/228 |

FOREIGN PATENT DOCUMENTS

| | | | |
|---|---|---|---|
| JP | 2017-147626 A | 8/2017 | |
| JP | 2018-077649 A | 5/2018 | |
| WO | WO-2021059715 A1 * | 4/2021 | ........... G05D 1/0038 |

* cited by examiner

REMOTE ASSISTANCE APPARATUS, METHOD, AND PROGRAM

CROSS-REFERENCE TO RELATED APPLICATION

The present application is a continuation application of International Application No. PCT/JP2020/028745, filed on Jul. 27, 2020, which claims priority to Japanese Patent Application No. 2019-178934, filed on Sep. 30, 2019. The contents of these applications are incorporated herein by reference in their entirety.

BACKGROUND

Technical Field

The present disclosure relates to a remote assistance technique that remotely assists an autonomous driving vehicle.

Related Art

Various remote assistance systems that remotely assist autonomous driving vehicles have been proposed. In such remote assistance systems, in a case in which a driver is not present in the autonomous driving vehicle and the autonomous driving vehicle stops as a result of an occurrence of a traveling abnormality during autonomous traveling, remote assistance instructions are issued to the autonomous driving vehicle from an operator in a control room, through a remote assistance center. The traveling abnormality is addressed based on the remote assistance instructions from the operator and autonomous traveling is resumed.

SUMMARY

One aspect of the present disclosure provides a remote assistance apparatus that records, in an assistance content recording unit, assistance contents for remote assistance to be provided to an autonomous driving vehicle in which the assistance contents include an assistance location. The remote assistance apparatus detects an autonomous driving vehicle that is expected to pass through a predetermined assistance location that is included in predetermined assistance contents that are recorded in the assistance content recording unit. The remote assistance apparatus determines an assistance method of the remote assistance to be provided to the autonomous driving vehicle that is detected by the assisted vehicle detecting unit based on the predetermined assistance contents that are recorded in the assistance content recording unit.

DESCRIPTION OF THE EMBODIMENTS

Figure 1:
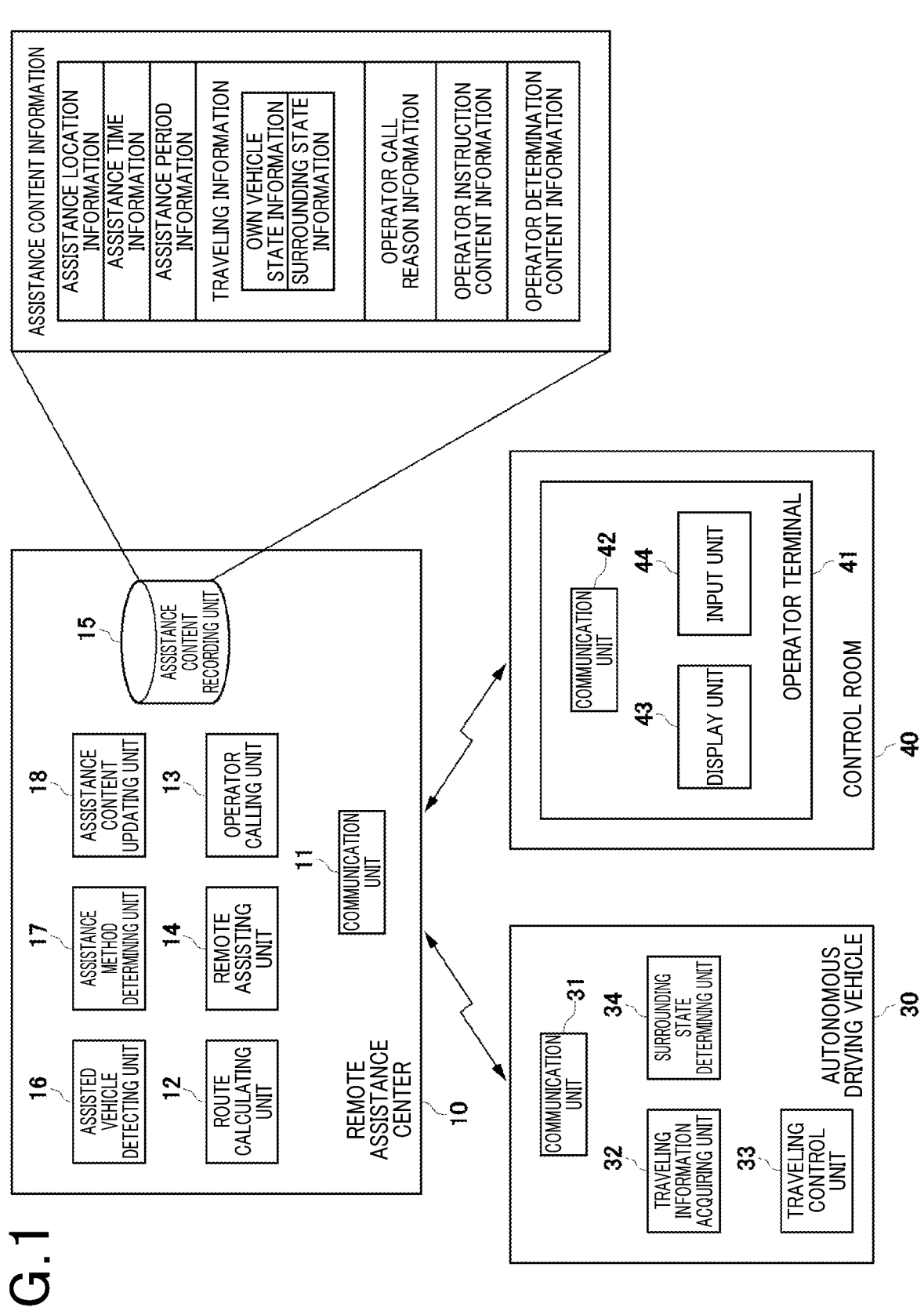
FIG. 1 is a block diagram illustrating a remote assistance system according to an embodiment of the present disclosure.

The following embodiments of the present disclosure relate to a remote assistance apparatus that remotely assists an autonomous driving vehicle, a method, and a program.

Conventionally, various remote assistance systems that remotely assist autonomous driving vehicles have been proposed (for example, refer to JP-A-2017-147626). In such remote assistance systems, in a case in which a driver is not present in the autonomous driving vehicle and the autonomous driving vehicle stops as a result of an occurrence of a traveling abnormality during autonomous traveling, remote assistance instructions are issued to the autonomous driving vehicle from an operator in a control room, through a remote assistance center. The traveling abnormality is addressed based on the remote assistance instructions from the operator and autonomous traveling is resumed.

When the traveling abnormality cannot be addressed even by the remote assistance instruction from the operator and autonomous traveling cannot be resumed, the operator requests assistance from assistance personnel and dispatches the assistance personnel to the autonomous driving vehicle. The assistance personnel addresses the traveling abnormality by manual driving and autonomous traveling is resumed.

As a result of detailed examination by the inventors, an issue has been found in that, when a stopping period of the autonomous driving vehicle during autonomous traveling increases, in addition to traffic flow being adversely affected, a passenger of the autonomous driving vehicle experiences unease and distrust.

It is thus desired to provide a remote assistance apparatus that is capable of shortening a stopping period of an autonomous driving vehicle during autonomous traveling, a method, and a program.

A first exemplary embodiment of the present disclosure provides a remote assistance apparatus that includes: an assistance content recording unit that records therein assistance contents for remote assistance to be provided to an autonomous driving vehicle in response to the autonomous driving vehicle stopping as a result of an occurrence of a traveling abnormality, and then resumes autonomous traveling as a result of remote assistance for the autonomous driving vehicle being provided by an operator, the assistance contents including an assistance location and operator instruction contents for the remote assistance instructed by the operator; an assisted vehicle detecting unit that detects an autonomous driving vehicle that is expected to pass through a predetermined assistance location that is included in predetermined assistance contents that are recorded in the assistance content recording unit; and an assistance method determining unit that determines an assistance method of the remote assistance to be provided to the autonomous driving vehicle that is detected by the assisted vehicle detecting unit based on the predetermined assistance contents that are recorded in the assistance content recording unit.

A second exemplary embodiment of the present disclosure provides a remote assistance method comprising: recording, in an assistance content recording unit, assistance contents of remote assistance to be provided to an autonomous driving vehicle in response to the autonomous driving vehicle stopping as a result of an occurrence of a traveling abnormality, and then resuming autonomous traveling as a result of remote assistance for the autonomous driving vehicle being provided by an operator, the assistance contents including an assistance location and operator instruction contents for the remote assistance instructed by the operator; detecting an autonomous driving vehicle that is expected to pass through a predetermined assistance location that is included in predetermined assistance contents that are recorded in the assistance content recording unit; and determining an assistance method of the remote assistance to be provided to the autonomous driving vehicle that is detected, based on the predetermined assistance contents that are recorded in the assistance content recording unit.

A third exemplary embodiment of the present disclosure provides a non-transitory computer-readable storage medium storing therein a remote assistance program that when read and executed by a computer, causes the computer to implement: recording, in an assistance content recording unit, assistance contents for remote assistance to an autonomous driving vehicle in response to the autonomous driving vehicle stopping as a result of an occurrence of a traveling abnormality, and then resuming autonomous traveling as a result of remote assistance for the autonomous driving vehicle being provided by an operator, the assistance contents including an assistance location and operator instruction contents for the remote assistance instructed by the operator; detecting an autonomous driving vehicle that is expected to pass through a predetermined assistance location that is included in predetermined assistance contents that are recorded in the assistance content recording unit; and determining an assistance method of the remote assistance to be provided to the autonomous driving vehicle that is detected, based on the predetermined assistance contents that are recorded in the assistance content recording unit.

As a result, a stopping period of an autonomous driving vehicle during autonomous traveling can be shortened.

The above-described object, other objects, characteristics, and advantages of the present disclosure will be further clarified through the contented description below, with reference to the accompanying drawings.

A remote assistance system and a method according to an embodiment of the present disclosure will be described with reference to FIGS. 1 to 4.

The remote assistance system according to the present embodiment will be described with reference to FIG. 1.

Configurations for implementing various functions of the remote assistance system will be successively described below, upon description of an overall configuration of the overall remote assistance system.

As shown in FIG. 1, the remote assistance system is formed by a remote assistance center 10, a plurality of autonomous driving vehicles 30, and a plurality of control rooms 40. The remote assistance center 10 is formed in a cloud. Regarding the autonomous driving vehicle 30, a driver is ordinarily not present. However, when assistance personnel is dispatched, the autonomous driving vehicle 30 can be manually driven by the assistance personnel. In addition, according to the present embodiment, the autonomous driving vehicle 30 is a vehicle that transports passengers, such as a taxi or a bus. The remote assistance center 10 and the autonomous driving vehicle 30 are capable of communicating with each other through respective communication units 11 and 31. Furthermore, the remote assistance center 10 and the control room 40 are capable of communicating with each other through respective communication units 11 and 42.

The remote assistance system provides a function for performing autonomous traveling of the autonomous driving vehicle 30.

That is, in the remote assistance center 10, a route calculating unit 12 calculates a route for autonomous traveling of the autonomous driving vehicle 30 and transmits the route information to the autonomous driving vehicle 30. In the autonomous driving vehicle 30, a traveling information acquiring unit 32 acquires traveling information from various sensors in the autonomous driving vehicle 30.

The traveling information includes own vehicle state information that indicates a state of the own vehicle such as a position, speed, and the like of the own vehicle, and surrounding state information that indicates a state surrounding the own vehicle such as camera information and radar information on the surroundings of the own vehicle.

A traveling control unit 33 controls the autonomous driving vehicle 30 and performs autonomous traveling, based on the route information that is received from the route calculating unit 12 of the remote assistance center 10 and the traveling information that is acquired by the traveling information acquiring unit 32.

When the autonomous driving vehicle 30 stops as a result of an occurrence of a traveling abnormality during autonomous traveling, the remote assistance system provides a function for performing remote assistance to the autonomous driving vehicle 30 and resuming autonomous traveling, and recording assistance contents for the remote assistance that is performed.

That is, the traveling information acquiring unit 32 transmits the acquired traveling information to the remote assistance center 10. In the remote assistance center 10, an operator calling unit 13 determines whether an operator call condition for calling an operator is established based on the received traveling information. When determined that the operator call condition is established, the operator calling unit 13 calls an appropriate control room 40 among the plurality of control rooms 40 and transmits the traveling information to the control room 40.

In the control room 40, a display unit 43 of an operator terminal 41 displays the received traveling information. The operator inputs a remote assistance instruction to an input unit 44 based on the traveling information that is displayed in the display unit 43. When the remote assistance instruction is an instruction for the autonomous driving vehicle 30, the operator terminal 41 transmits the remote assistance instruction to the remote assistance center 10. In the remote assistance center 10, a remote assisting unit 14 transmits the received remote assistance instruction to the autonomous driving vehicle 30. In the autonomous driving vehicle 30, the traveling control unit 33 controls the autonomous driving vehicle 30 based on the received remote assistance instruction, addresses the traveling abnormality, and resumes autonomous traveling.

Meanwhile, when the remote assistance instruction is an assistance request for an assistance personnel center (not shown), the operator terminal 41 transmits the assistance request to the assistance personnel center and also transmits the traveling information. The assistance personnel center dispatches assistance personnel to the autonomous driving vehicle 30 based on the received traveling information. The traveling abnormality is addressed through manual driving by the assistance personnel, and autonomous traveling is resumed. When the autonomous driving vehicle 30 starts autonomous traveling, the operator inputs, to the input unit 44, operator determination contents that are determination contents that are determined by the operator in the remote assistance.

In the remote assistance center 10, an assistance content recording unit 15 records therein assistance contents for remote assistance when the operator performs the remote assistance, and collects the plurality of assistance contents. Assistance content information that is recorded in the assistance content recording unit 15 includes various types of information below.

Assistance location information is information that indicates a location at which the remote assistance to the autonomous driving vehicle 30 is performed. Assistance time information is information that indicates time at which the remote assistance to the autonomous driving vehicle 30 is performed. Assistance period information is information that indicates a period of time from stopping of the autonomous driving vehicle 30 as a result of an occurrence of a traveling abnormality to resumption of autonomous traveling. The traveling information is as described above. Operator call reason information is information that indicates a reason for calling the operator.

According to the present embodiment, the operator call reason information is information that indicates establishment of the operator call condition. Operator instruction content information is information that indicates instructions of the remote assistance instruction by the operator. Operator determination content information is information that indicates the determination contents that are determined by the operator in the remote assistance and includes information that indicates specific contents of the traveling abnormality.

The remote assistance system provides a function for detecting, as an assisted vehicle, the autonomous driving vehicle 30 that is expected to pass through a predetermined assistance position that is included in predetermined assistance contents among the plurality of assistance contents that are collected, determining an assistance method of the remote assistance to the autonomous driving vehicle 30 that is detected as the assisted vehicle, and performing the remote assistance based on the assistance method.

That is, in the remote assistance center 10, an assisted vehicle detecting unit 16 detects, as the assisted vehicle, the autonomous driving vehicle 30 that is expected to pass through the predetermined assistance position that is included in the predetermined assistance contents among the assistance contents that are collected in the assistance content recording unit 15, based on the route information that is calculated by the route calculating unit 12, the traveling information that is received from the autonomous driving vehicle 30, and the assistance content information that is collected in the assistance content recording unit 15. An assistance method determining unit 17 determines the assistance method of the remote assistance to the assisted vehicle based on the predetermined assistance contents. In addition, the assistance method determining unit 17 transmits advance instruction information that indicates the assistance method of the remote assistance to an appropriate configuration in advance. The remote assistance system performs the remote assistance based on the advance instruction information that indicates the assistance method.

According to the present embodiment, regarding the autonomous driving vehicle 30 that is detected by the assisted vehicle detecting unit 16, the assistance method determining unit 17 causes the route calculating unit 12 to calculate a detour route that bypasses the predetermined assistance location. When rerouting via the detour route can be performed and a detour period that is required to bypass the assistance location is shorter than the predetermined assistance period that is included in the predetermined assistance contents, the assistance method determining unit 17 determines the assistance method to be rerouting via the detour route. However, when a predetermined resolution period that is based on the operator determination contents that are included in the predetermined assistance contents elapses from the predetermined assistance time that is included in the predetermined assistance contents, the assistance method determining unit 17 does not determine the assistance method to be rerouting via the detour route. When the assistance method is determined to be rerouting via the detour route, the assistance method determining unit 17 transmits detour route information to the autonomous driving vehicle 30 as the advance instruction information. In the autonomous driving vehicle 30, the traveling control unit 33 controls the autonomous driving vehicle 30 based on the received detour route information and performs autonomous traveling.

When the autonomous driving vehicle 30 is determined to be capable of handling the predetermined recorded operator instruction contents that are included in the predetermined assistance contents that are recorded in the assistance content recording unit 15, the assistance method determining unit 17 determines the assistance method to be execution of the predetermined recorded operator instruction contents. In addition, the assistance method determining unit 17 transmits predetermined recorded operator instruction content information and predetermined recorded surrounding state information that is included in the predetermined assistance contents to the autonomous driving vehicle 30 in advance as the advance instruction information. In the autonomous driving vehicle 30, the traveling control unit 33 stores the predetermined recorded operator instruction content information and the predetermined recorded surrounding state information that are received as the advance instruction information.

When the operator calling unit 13 determines that the autonomous driving vehicle 30 has stopped as a result of an occurrence of a traveling abnormality in the predetermined assistance location, the traveling control unit 33 causes a surrounding state determining unit 34 to determine whether the predetermined recorded surrounding state and the surrounding state that is acquired by the traveling information acquiring unit 32 match. Then, when the surrounding state determining unit 34 determines that the predetermined recorded surrounding information and the acquired surrounding information match, the traveling control unit 33 controls the autonomous driving vehicle 30 based on the predetermined recorded operator instruction contents.

Meanwhile, when the autonomous driving vehicle 30 is determined to not be capable of handling the predetermined recorded operator instruction contents that are included in the predetermined assistance contents that are recorded in the assistance content recording unit 15, the assistance method determining unit 17 determines the assistance method to be easing of the operator call condition. In addition, the assistance method determining unit 17 transmits operator-call-condition easing information to the operator calling unit 13 in advance as the advance instruction information. The operator calling unit 13 stores the operator-call-condition easing information that is received as the advance instruction information. Then, when determined that the own vehicle 30 has stopped as a result of an occurrence of a traveling abnormality in the predetermined assistance location, the operator calling unit 13 eases the operator call condition based on the operator-call-condition easing information. When the operator call condition that has been eased is determined to be established, the operator calling unit 13 calls the appropriate control room 40.

The remote assistance system provides a function for updating the recorded assistance contents.

That is, in the remote assistance center 10, regarding the autonomous driving vehicle 30 that is detected by the assisted vehicle detecting unit 16, when the operator calling unit 13 does not determine that the autonomous driving vehicle 30 has stopped as a result of an occurrence of a traveling abnormality at the predetermined assistance location, regardless of the assistance method determining unit 17 having determined the assistance contents for the remote assistance at the predetermined assistance location, an assistance content updating unit 18 deletes the predetermined assistance contents should a deletion period that is based on the predetermined operator determination contents elapse from the predetermined assistance time.

A remote assistance method according to the present embodiment will be described with reference to FIGS. 2 to 4.

An assistance content recording step of the remote assistance method according to the present embodiment will be described with reference to FIG. 2. At the assistance content recording step, when the autonomous driving vehicle 30 stops as a result of an occurrence of a traveling abnormality during autonomous traveling, remote assistance to the autonomous driving vehicle 30 is performed and autonomous traveling is resumed. In addition, the assistance contents for the remote assistance that is performed are recorded.

Traveling Information Acquiring Step S11

At a traveling information acquiring step S11, the traveling information of the autonomous driving vehicle 30 is acquired.

Operator-Call-Condition Establishment Determining Step S12

At an operator-call-condition establishment determining step S12, whether the operator call condition for calling the operator is established is determined based on the traveling information of the autonomous driving vehicle 30 that is acquired at the traveling information acquiring step S11. When the operator call condition is established, the remote assistance method proceeds to an operator calling step S13. Meanwhile, when the operator call condition is not established, the remote assistance method returns to the traveling information acquiring step S11. Here, the remote assistance to the autonomous driving vehicle 30 by the operator is required when the autonomous driving vehicle 30 stops as a result of an occurrence of a traveling abnormality, such as a traffic jam, roadside parking, or an accident scene, autonomous traveling cannot be resumed by the autonomous driving vehicle 30 alone, and stopping of the autonomous driving vehicle 30 is continued. According to the present embodiment, a stopping period of the autonomous driving vehicle 30 as a result of an occurrence of a traveling abnormality exceeding a predetermined threshold is used as the operator call condition.

Operator Calling Step S13

At the operator calling step S13, the operator is called.

Remote Assistance Executing Step S14

At a remote assistance executing step S14, the remote assistance to the autonomous driving vehicle 30 is performed by the operator that is called at the operator calling step S13. When determined that the traveling abnormality can be resolved and autonomous traveling can be resumed by the remote assistance instruction for the autonomous driving vehicle 30, the operator issues the remote assistance instruction to the autonomous driving vehicle 30. The autonomous driving vehicle 30 addresses the traveling abnormality based on the remote assistance instruction from the operator.

According to the present embodiment, the operator issues a stopping continuance instruction when the traveling abnormality is a traffic jam, an overtaking or lane change instruction when the traveling abnormality is roadside parking, a detour instruction when the traveling abnormality is an accident scene, and the like. Meanwhile, when determined that the traveling abnormality cannot be resolved and autonomous traveling cannot be resumed by the remote assistance instruction for the autonomous driving vehicle 30, the operator issues the assistance request to the assistance personnel center as the remote assistance instruction. The assistance personnel center dispatches assistance personnel to the autonomous driving vehicle 30 based on the assistance request from the operator, and the assistance personnel addresses the traveling abnormality by manual driving.

Autonomous Traveling Resuming Determining Step S15

At an autonomous traveling resumption determining step S15, whether the autonomous driving vehicle 30 has resumed autonomous traveling as a result of execution of the remote assistance to the autonomous driving vehicle 30 by the operator at the remote assistance executing step S14 is determined. When the autonomous driving vehicle 30 is determined to have resumed autonomous traveling, the remote assistance method proceeds to an assistance content recording step S16. When the autonomous driving vehicle 30 is determined to have not resumed autonomous traveling, the remote assistance method returns to the remote assistance executing step S14 and the remote assistance to the autonomous driving vehicle 30 by the operator is continued.

Assistance Content Recording Step S16

At the assistance content recording step S16, after the autonomous driving vehicle 30 is determined to have resumed autonomous traveling at the autonomous traveling resumption determining step S15, the assistance contents for the remote assistance to be provided to the autonomous driving vehicle 30 by the operator are recorded. The assistance contents include the operator determination contents that are determination contents that are determined by the operator in the remote assistance and inputted by the operator. Specific contents of the traveling abnormality are included in the operator determination contents. According to the present embodiment, the specific contents of the traveling abnormality includes a traffic jam, roadside parking, an accident scene, and the like.

The assistance content recording step described above is repeatedly performed for the plurality of instances of remote assistance to the plurality of autonomous driving vehicles 30. The plurality of assistance contents for the remote assistance to be provided to the plurality of autonomous driving vehicles 30 by the operator are collected.

An assistance method determining step of the remote assistance method according to the present embodiment will be described with reference to FIG. 3. At the assistance method determining step, the autonomous driving vehicle 30 that is expected to pass through a predetermined assistance position that is included in predetermined assistance contents among the plurality of assistance contents that are collected is detected as the assisted vehicle, and the assistance method of the remote assistance to the autonomous driving vehicle is determined based on the predetermined assistance contents.

Assistance Content Acquiring Step S21

At an assistance content acquiring step S21, the predetermined assistance contents are acquired from the plurality of assistance contents that have been collected.

Assisted Vehicle Detecting Step S22

At an assisted vehicle detecting step S22, the autonomous driving vehicle 30 that is expected to pass through the predetermined assistance location that is included in the predetermined assistance contents that are acquired at the assistance content acquiring step S21 is detected as the assisted vehicle.

Rerouting Possibility Determining Step S23

At a rerouting possibility determining step S23, whether rerouting via a detour route that bypasses the predetermined assistance location is possible is determined regarding the autonomous driving vehicle 30 that is detected at the assisted vehicle detecting step S22. When rerouting via the detour route is determined to be possible, the remote assistance method proceeds to a detour period determining step S24. Meanwhile, when rerouting via the detour route is determined to not be possible, the remote assistance method proceeds to an instruction content determining step S27.

Here, as a result of the autonomous driving vehicle 30 being made to autonomously travel on the detour route that bypasses the predetermined assistance location, the autonomous driving vehicle 30 stopping as a result of the occurrence of the traveling abnormality at the predetermined assistance location can be prevented. Here, a case in which rerouting via the detour route not possible is when a detour route is not present and a detour route cannot be used.

Detour Period Determining Step S24

At the detour period determining step S24, whether the detour period that is required to bypass the predetermined assistance location is shorter than the predetermined assistance period that is included in the predetermined assistance contents is determined. When the detour period is determined to be shorter than the predetermined assistance period, the remote assistance method proceeds to a resolution period determining step S25. Meanwhile, when the detour period is determined to not be shorter than the predetermined assistance period, the remote assistance method proceeds to the instruction content determining step S27.

Here, when the detour period is shorter than the predetermined assistance period, a destination is reached earlier by the detour route that bypasses the predetermined assistance location being autonomously traveled than by an original route that passes through the predetermined assistance location being traveled while remote assistance is performed. Therefore, the detour route is preferably used. Meanwhile, when the detour period is not shorter than the predetermined assistance period, the destination is reached later by the detour route being traveled.

Resolution Period Determining Step S25

In the resolution period determining step S25, whether the predetermined resolution period that is based on the predetermined operator determination contents that are included the predetermined assistance contents has elapsed from the predetermined assistance time that is included in the predetermined assistance contents is determined. When the predetermined resolution period is determined to have not elapsed from the predetermined assistance time, the remote assistance method proceeds to a reroute determining step S26. Meanwhile, when the predetermined resolution period is determined to have elapsed from the predetermined assistance time, the remote assistance method proceeds to the instruction content determining step S27.

Here, when the predetermined resolution period that is based on the operator determination contents has elapsed from the predetermined assistance time at which the remote assistance is performed at the predetermined assistance location, a likelihood that the traveling abnormality at the predetermined assistance location has been resolved is present. Therefore, when the predetermined resolution period has elapsed from the predetermined assistance time, the original route that passes through the predetermined assistance location is used without rerouting via the detour route being performed. When the traveling abnormality at the predetermined assistance location is resolved, the autonomous driving vehicle 30 can autonomously travel on the original route that passes through the predetermined assistance location without receiving the remote assistance. Here, the resolution period until the traveling abnormality is resolved is dependent on specific contents of the traveling abnormality such as a traffic jam, roadside parking, or an accident site. Therefore, the predetermined resolution period is determined based on the operator determination contents that include the specific contents of the traveling abnormality.

Reroute Determining Step S26

At the reroute determining step S26, the assistance method for the remote assistance to the autonomous driving vehicle 30 is determined to be rerouting via the detour route that bypasses the predetermined assistance location.

Instruction Content Determining Step S27

At the instruction content determining step S27, whether the autonomous driving vehicle 30 is capable of handling the predetermined recorded operator instruction contents that are included in the predetermined assistance contents is determined. When the autonomous driving vehicle 30 is determined to be capable of handling the predetermined recorded operator instruction contents, the remote assistance method proceeds to an instruction content execution determining step S28. Meanwhile, when the autonomous driving vehicle 30 is determined to not be capable of handling the predetermined recorded operator instruction contents, the remote assistance method proceeds to a call condition easing determining step S29.

Here, according to the present embodiment, a case in which the autonomous driving vehicle 30 is capable of handling the predetermined recorded operator instruction contents is a case in which the remote assistance instruction is an instruction for the autonomous driving vehicle 30 or the like, and the autonomous driving vehicle 30 itself is capable of addressing the traveling abnormality based on the operator instruction contents. Meanwhile, a case in which the autonomous driving vehicle 30 is not capable of handling the predetermined recorded operator instruction contents is a case in which the remote assistance instruction is an assistance request for the assistance personnel center or the like, and the autonomous driving vehicle 30 itself addressing the traveling abnormality based on the operator instruction contents is difficult. In such cases, providing remote assistance to the autonomous driving vehicle 30 by the operator is required. Therefore, the operator call condition is preferably eased such that the operator can be promptly called.

Instruction Content Execution Determining Step S28

At the instruction content execution determining step S28, the assistance method of the remote assistance to the autonomous driving vehicle 30 is determined to be execution of the predetermined recorded operator instruction contents.

Call Condition Easing Determining Step S29

At the call condition easing determining step S29, the assistance method of the remote assistance to the autonomous driving vehicle 30 is determined to be easing of the operator call condition.

Figure 4:
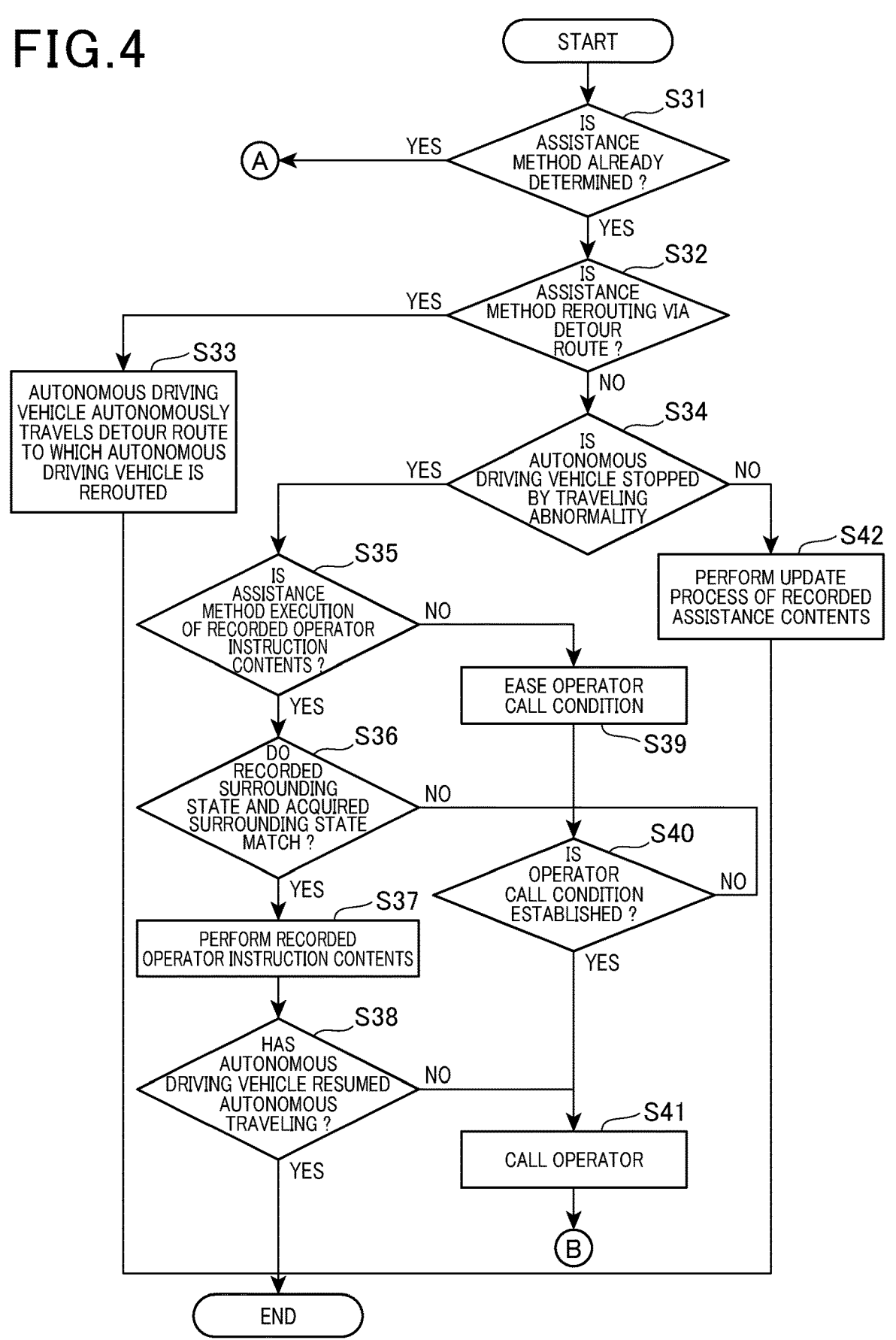
FIG. 4 is a flowchart illustrating an assistance method executing step in a remote assistance method according to an embodiment of the present disclosure.

With reference to FIG. 4, an assistance method executing step of the remote assistance method according to the present embodiment will be described. At the assistance method executing step, the remote assistance that is based on the assistance method that is determined at the assistance method determining step is performed.

Assistance Method-Determined Determining Step S31

At an assistance method-determined determining step S31, whether the assistance method of the remote assistance is already determined is determined. When the assistance method of the remote assistance is determined to already be determined, the remote assistance method proceeds to a reroute determination determining step S32. Meanwhile, when the assistance method of the remote assistance is determined to not already be determined, the remote assistance method proceeds to the traveling information acquiring step S11 of the assistance content recording step shown in FIG. 2.

Reroute Determination Determining Step S32

At the reroute determination determining step S32, whether the assistance method of the remote assistance is rerouting via the detour route is determined. When the assistance method of the remote assistance is rerouting via the detour route, the remote assistance method proceeds to a reroute executing step S33. Meanwhile, when the assistance method of the remote assistance is not rerouting via the detour route, the remote assistance method proceeds to a traveling abnormality determining step S34.

Reroute Executing Step S33

At the reroute executing step S33, the autonomous driving vehicle 30 is made to autonomously travel on the detour route to which the autonomous driving vehicle 30 is rerouted. Here, because the detour route bypasses the predetermined assistance location, the autonomous driving vehicle 30 stopping as a result of the occurrence of the traveling abnormality at the predetermined assistance location is prevented. In addition, because the detour period is shorter than the predetermined assistance period, the destination can be reached earlier than by the original route that passes through the predetermined assistance location being traveled while remote assistance is performed.

Traveling Abnormality Determining Step S34

At the traveling abnormality determining step S34, whether the autonomous driving vehicle 30 has stopped as a result of the occurrence of the traveling abnormality at the predetermined assistance location is determined. When the autonomous driving vehicle 30 is determined to have stopped as a result of the occurrence of the traveling abnormality at the predetermined assistance location, the remote assistance method proceeds to an instruction content execution determination determining step S35. Meanwhile, when autonomous driving vehicle 30 is determined to have not stopped as a result of the occurrence of the traveling abnormality at the predetermined assistance location, the remote assistance method proceeds to an assistance content updating step S42.

Here, when the predetermined resolution period has elapsed from the predetermined assistance time and the original route that passes through the predetermined assistance location is used without rerouting via the detour route being performed, a likelihood that the traveling abnormality at the predetermined assistance location has been resolved and the autonomous driving vehicle 30 will not be stopped by the traveling abnormality at the predetermined assistance location is present.

Instruction Content Execution Determination Determining Step S35

At the instruction content execution determination determining step S35, whether the assistance method of the remote assistance is execution of the predetermined recorded operator instruction contents is determined. When the assistance method of the remote assistance is determined to be execution of the predetermined recorded operator instruction contents, the remote assistance method proceeds to a surrounding state determining step S36. Meanwhile, when the assistance method of the remote assistance is determined to not be execution of the predetermined recorded operator instruction contents, the remote assistance method proceeds to a call condition easing step S39.

Surrounding State Determining Step S36

At the surrounding state determining step S36, whether the predetermined recorded surrounding state that is included in the predetermined assistance contents and the surrounding state that is acquired by the autonomous driving vehicle 30 match is determined. When the predetermined recorded surrounding state and the acquired surrounding state match, the remote assistance method proceeds to an instruction content executing step S37. Meanwhile, when the predetermined recorded surrounding state and the acquired surrounding state do not match, the remote assistance method proceeds to a call condition establishment determining step S40.

Here, when the predetermined recorded surrounding state and the acquired surrounding state match, in a manner similar to that when the remote assistance based on the predetermined assistance contents is performed, a likelihood that the autonomous driving vehicle 30 can appropriately address the traveling abnormality and resume autonomous traveling by the autonomous driving vehicle 30 being controlled based on the predetermined recorded operator instruction contents is high. Therefore, the predetermined recorded operator instruction contents are preferably performed. However, when the predetermined recorded surrounding state and the acquired surrounding state do not match, even when the autonomous driving vehicle 30 is controlled based on the predetermined recorded operator instruction contents, a likelihood that the autonomous driving vehicle 30 cannot appropriately address the traveling abnormality is high. A likelihood of autonomous traveling being resumed is low.

Instruction Content Executing Step S37

At the instruction content executing step S37, the autonomous driving vehicle 30 is made to perform the predetermined recorded operator instruction contents at the predetermined assistance location.

Autonomous Traveling Resumption Determining Step S38

At an autonomous traveling resumption determining step S38, whether the autonomous driving vehicle 30 has resumed autonomous driving is determined. When the autonomous driving vehicle 30 is determined to have resumed autonomous driving, the assistance method executing step is ended. When the autonomous driving vehicle 30 is determined to not have resumed autonomous driving, the remote assistance method proceeds to an operator calling step S41.

Here, the predetermined recorded operator instruction contents include the predetermined assistance contents that include the predetermined assistance location, and can be handled by the autonomous driving vehicle 30. In addition, the predetermined recorded surrounding state and the surrounding state that is acquired by the autonomous driving vehicle 30 match. Therefore, in a manner similar to that when the autonomous driving vehicle 30 performs the remote assistance based on the predetermined assistance contents, a likelihood that the traveling abnormality can be appropriately addressed and autonomous traveling can be resumed at an early stage is high.

Call Condition Easing Step S39

At the calling condition easing step S39, the operator call condition is eased. According to the present embodiment, the threshold of the stopping period of the autonomous driving vehicle 30 for calling the operator is sufficiently decreased, and the operator is called immediately after stopping of the autonomous driving vehicle 30 as a result of the occurrence of the traveling abnormality.

Call Condition Establishment Determining Step S40

At the call condition establishment determining step S40, whether the operator call condition is established is determined. When the operator call condition is established, the remote assistance method proceeds to the operator calling step S41.

Operator Calling Step S41

Figure 2:
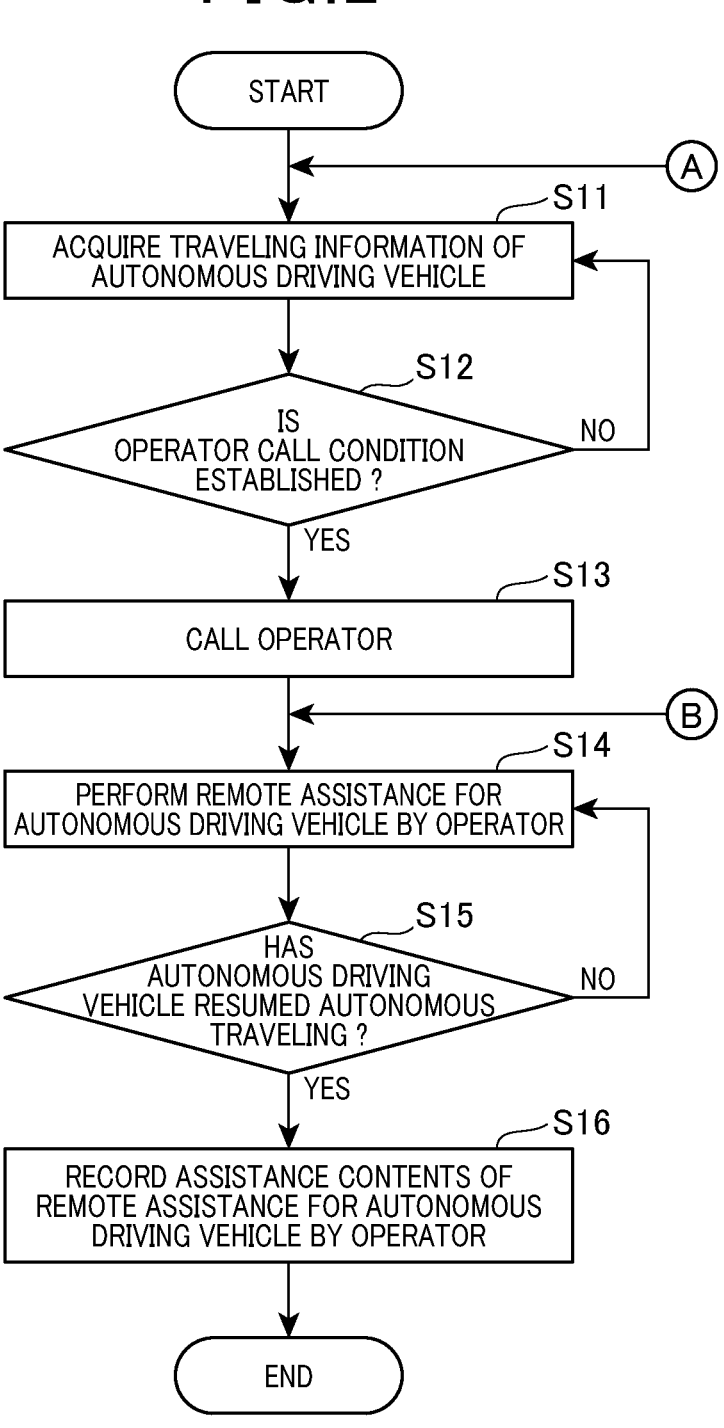
FIG. 2 is a flowchart illustrating an assistance content recording step in a remote assistance method according to an embodiment of the present disclosure.
Figure 3:
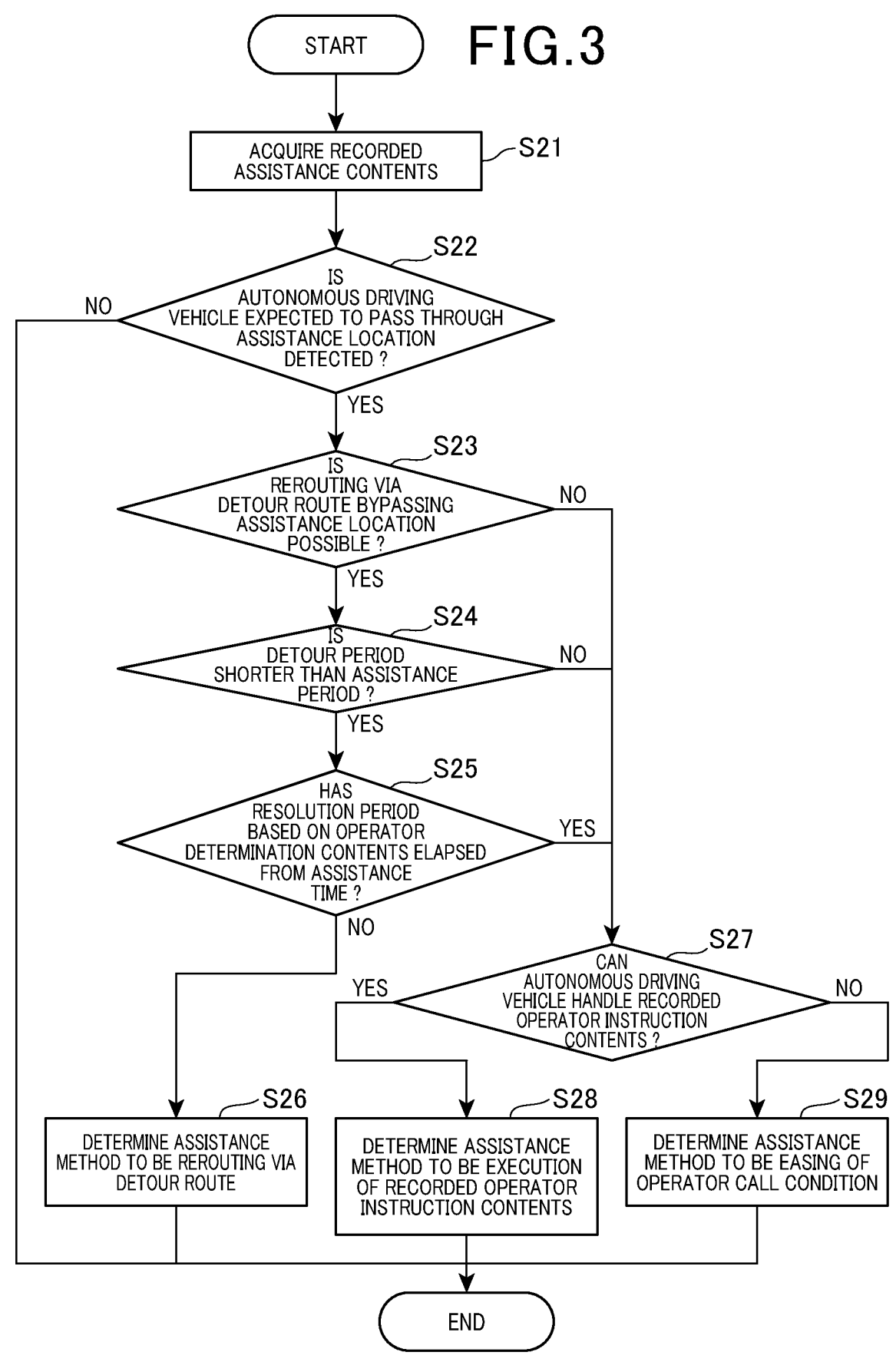
FIG. 3 is a flowchart illustrating an assistance method determining step in a remote assistance method according to an embodiment of the present disclosure.

At the operator calling step S41, the operator is called and the remote assistance method proceeds to the remote assistance executing step S14 of the assistance content recording step shown in FIG. 2.

Assistance Content Updating Step S42

At the assistance content updating step S42, when the autonomous driving vehicle 40 is determined to have not stopped as a result of the occurrence of the traveling abnormality at the predetermined assistance location at the traveling abnormality determining step S34, the predetermined assistance contents are deleted should the deletion period that is based on the predetermined operator determination contents elapse from the predetermined assistance time.

Here, when the traveling abnormality does not occur and the autonomous driving vehicle 30 does not stop at the predetermined assistance location, the traveling abnormality is considered resolved at a current time. When the predetermined deletion period that is based on the operator determination contents has elapsed from the predetermined assistance time, the traveling abnormality at the predetermined assistance location is considered completely resolved and the predetermined assistance contents that include the predetermined assistance location are deleted. The deletion period until the traveling abnormality is completely resolved is dependent on the specific contents of the traveling abnormality such as a traffic jam, roadside parking, or an accident site. Therefore, the predetermined deletion period is determined based on the operator determination contents that include the specific contents of the traveling abnormality.

The following effects are achieved by the remote assistance system and the method according to the present embodiment.

In the remote assistance system and the method according to the present embodiment, the assistance contents for the remote assistance to be provided to the autonomous driving vehicle 30 are recorded. The autonomous driving vehicle 30 that is expected to pass through the predetermined assistance location that is included in the predetermined assistance contents is detected as the assisted vehicle. The assistance method of the remote assistance to the autonomous driving vehicle 30 is determined based on the predetermined recorded assistance contents. Therefore, the remote assistance to the autonomous driving vehicle 30 can be accurately performed. The stopping period of the autonomous driving vehicle 30 during autonomous traveling can be shortened.

According to the present embodiment, the assistance method of the remote assistance is determined to be rerouting via the detour route that bypasses the predetermined assistance location, and the autonomous driving vehicle 30 is made to autonomously travel on the detour route. Therefore, the autonomous driving vehicle 30 stopping as a result of the occurrence of the traveling abnormality at the predetermined assistance location can be prevented. Occurrence of the stopping period of the autonomous driving vehicle 30 during autonomous traveling can be prevented.

Furthermore, when the detour period is shorter than the predetermined assistance period that is included in the predetermined assistance contents, the assistance method of the remote assistance is determined to be rerouting via the detour route. Therefore, the destination can be reached earlier than by the original route that passes through the predetermined assistance location being traveled while remote assistance is performed.

In addition, when the resolution period that is based on the operator determination contents has elapsed from the predetermined assistance time that is included in the predetermined assistance contents, the assistance method of the remote assistance is not determined to be rerouting via the detour route. Therefore, when the traveling abnormality at the predetermined assistance location has been resolved, the autonomous driving vehicle 30 can pass through the predetermined assistance location and autonomously travel on the original route without receiving remote assistance.

According to the present embodiment, the assistance method of the remote assistance is determined to be execution of the predetermined recorded operator instruction contents that are included in the predetermined assistance contents, and the autonomous driving vehicle 30 is made to perform the predetermined recorded operator instruction contents at the predetermined assistance location. Therefore, in a manner similar to that when the remote assistance based on the predetermined assistance contents is performed, the traveling abnormality can be appropriately addressed, autonomous traveling can be resumed at an early stage, and the stopping period of the autonomous driving vehicle 30 during autonomous traveling can be shortened.

In particular, when the predetermined operator instruction contents that are performed by the autonomous driving vehicle 30 can be handled by the autonomous driving vehicle 30, and the predetermined recorded surrounding state and the surrounding state that is acquired by the autonomous driving vehicle 30 match, because the assistance method of the remote assistance is determined to be execution of the predetermined recorded operator instruction contents, in a manner similar to that when the remote assistance based on the predetermined assistance contents is performed, the traveling abnormality can be appropriately addressed and autonomous traveling can be resumed at an early stage.

According to the present embodiment, the assistance method of the remote assistance is determined to be easing of the operator call condition, and the operator call condition is eased. Therefore, the operator can be promptly called and the stopping period of the autonomous driving vehicle 30 during autonomous traveling can be shortened.

In particular, when the autonomous driving vehicle 30 is not capable of handling the predetermined recorded operator instruction contents, the autonomous driving vehicle 30 itself addressing the traveling abnormality based on the operator instruction contents is difficult, and remote assistance to the autonomous driving vehicle 30 by the operator is required, the assistance method of the remote assistance is determined to be easing of the operator call condition. Therefore, when calling of the operator is required in particular, the operator can be promptly called.

According to the present embodiment, because the recorded assistance contents are updated as required, appropriate assistance contents can be stored. In particular, when the traveling abnormality does not occur to the autonomous driving vehicle 30 at the predetermined assistance location and the autonomous driving vehicle 30 does not stop, the traveling abnormality is considered resolved at the current time. Furthermore, when the predetermined deletion period has elapsed from the predetermined assistance time, the traveling abnormality at the predetermined assistance location is considered completely resolved, and the predetermined assistance contents that include the predetermined assistance location are deleted. Therefore, unnecessary assistance contents can be deleted.

Here, according to the present embodiment, the operator calling unit 13 that determines whether the operator call condition is established and calls the operator is provided in the remote assistance center 10. Instead, a calling unit that provides a function similar to that of the operator calling unit 13 may be provided in the autonomous driving vehicle 30. In particular, when an extent of acquisition of the traveling information of the autonomous driving vehicle 30 is low and determination in the cloud regarding whether the operator call condition is established is not needed, the calling unit being provided in the autonomous driving vehicle 30 is appropriate.

In a present variation example, when operator call information is received from the calling unit of the autonomous driving vehicle 30, the operator calling unit 13 of the remote assistance center 10 calls the appropriate control room 40. In addition, when the assistance method of the remote assistance is determined, the assistance method determining unit 17 transmits the advance instruction information that indicates the assistance method of the remote assistance to the autonomous driving vehicle 30 in advance. In a manner similar to that according to the above-described embodiment, when the assistance method of the remote assistance is rerouting via the detour route, execution of the predetermined recorded operator instruction contents, or easing of the operator call condition, the advance instruction information is the detour route information, the predetermined recorded operator instruction contents and the predetermined recorded surrounding information, or the operator call condition easing information, respectively.

According to the above-described embodiments, the remote assistance system and the method are described. However, a program that actualizes the functions of the system on a computer, or a program that causes a computer to implement the steps of the method are also included in the scope of the present disclosure.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A remote assistance apparatus for providing remote assistance to an autonomous driving vehicle that has stopped due to an occurrence of a traveling abnormality, the apparatus comprising:

a computer;

a non-transitory computer-readable storage medium; and a set of computer-executable instructions stored on the non-transitory computer-readable storage medium that cause the computer to:

provide remote assistance to the autonomous driving vehicle that resumes autonomous traveling of the autonomous driving vehicle, the remote assistance provided by an operator located at a remote assistance center, the remote assistance including a plurality of assistance contents that provide the remote assistance for the autonomous driving vehicle, the plurality of assistance contents comprising assistance contents and predetermined assistance contents, the assistance contents including operator instruction contents for the remote assistance instructed by the operator, and the operator instruction contents including information for determining whether the operator instruction contents can be handled by the autonomous driving vehicle, the predetermined assistance contents including a predetermined assistance location;

record the plurality of assistance contents;

detect that the autonomous driving vehicle is expected to pass through the predetermined assistance location; and determine an assistance method of the remote assistance to be provided to the autonomous driving vehicle to perform the remote assistance based on the predetermined assistance contents, wherein:

the assistance method comprises rerouting of the autonomous driving vehicle via a detour route that bypasses the predetermined assistance location, the assistance contents include an assistance period that is required to perform the remote assistance; and the assistance method comprises rerouting of the autonomous driving vehicle via the detour route that bypasses the predetermined assistance location in response to a detour period that is required to bypass the predetermined assistance location being shorter than a predetermined assistance period that is included in the predetermined assistance contents, and wherein;

the autonomous driving vehicle is controlled to resume autonomous traveling based on the remote assistance provided by the operator;

the assistance contents include an assistance time at which the remote assistance is performed; and the assistance method does not comprise rerouting via a detour route that bypasses the predetermined assistance location when a predetermined resolution period has elapsed from a predetermined assistance time that is included in the predetermined assistance contents.

2. The remote assistance apparatus according to claim 1, wherein:

the assistance contents include operator instruction contents that are instructed by the operator in the remote assistance; and the assistance method comprises execution of predetermined operator instruction contents that are included in the predetermined assistance contents.

3. The remote assistance apparatus according to claim 2, wherein:

the assistance method comprises execution of the predetermined operator instruction contents when the autonomous driving vehicle is capable of handling the predetermined operator instruction contents.

4. The remote assistance apparatus according to claim 1, wherein:

the assistance method comprises easing of an operator call condition for calling an operator.

5. The remote assistance apparatus according to claim 4, wherein:

the assistance contents include operator instruction contents that are instructed by the operator in the remote assistance; and the assistance method comprises easing of the operator call condition, when the autonomous driving vehicle is not capable of handling predetermined operator instruction contents that are included in the predetermined assistance contents.

6. The remote assistance apparatus according to claim 1, further comprising:

the set of computer-executable instructions further cause the computer to update the assistance contents.

7. A remote assistance method for providing remote assistance to an autonomous driving vehicle that has stopped due to an occurrence of a traveling abnormality, the method comprising:

providing remote assistance to the autonomous driving vehicle that resumes autonomous traveling of the autonomous driving vehicle, the remote assistance provided by an operator located at a remote assistance center, the remote assistance including a plurality of assistance contents that provide the remote assistance for the autonomous driving vehicle, the plurality of assistance contents comprising assistance contents and predetermined assistance contents, the assistance contents including operator instruction contents for the remote assistance instructed by the operator, and the operator instruction contents including information for determining whether the operator instruction contents can be handled by the autonomous driving vehicle, the predetermined assistance contents including a predetermined assistance location;

recording the plurality of assistance contents;

detecting that the autonomous driving vehicle is expected to pass through the predetermined assistance location; and determining an assistance method of the remote assistance to be provided to the autonomous driving vehicle to perform the remote assistance based on the predetermined assistance contents, wherein:

the assistance method comprises rerouting of the autonomous driving vehicle via a detour route that bypasses the predetermined assistance location;

the assistance contents include an assistance period that is required to perform the remote assistance; and the assistance method comprises rerouting of the autonomous driving vehicle via the detour route bypasses the predetermined assistance location in response to a detour period that is required to bypass the predetermined assistance location being shorter than a predetermined assistance period that is included in the predetermined assistance contents, and wherein:

the autonomous driving vehicle is controlled to resume autonomous traveling based on the remote assistance provided by the operator;

the assistance contents include an assistance time at which the remote assistance is performed; and the assistance method does not comprise rerouting via a detour route that bypasses the predetermined assistance location when a predetermined resolution period has elapsed from a predetermined assistance time that is included in the predetermined assistance contents.

8. A non-transitory computer-readable storage medium storing therein a remote assistance program that when read and executed by a computer, causes the computer to implement:

provide remote assistance to an autonomous driving vehicle that has stopped due to an occurrence of a traveling abnormality, the remote assistance causing the autonomous driving vehicle to resume autonomous traveling, the remote assistance provided by an operator located at a remote assistance center, the remote assistance including a plurality of assistance contents that provide the remote assistance for the autonomous driving vehicle, the plurality of assistance contents comprising assistance contents and predetermined assistance contents, the assistance contents including operator instruction contents for the remote assistance instructed by the operator, and the operator instruction contents including information for determining whether the operator instruction contents can be handled by the autonomous driving vehicle, the predetermined assistance contents including a predetermined assistance location;

record the plurality of assistance contents;

detect that the autonomous driving vehicle is expected to pass through the predetermined assistance location; and determine an assistance method of the remote assistance to be provided to the autonomous driving vehicle to perform the remote assistance based on the predetermined assistance contents, wherein:

the assistance method comprises rerouting of the autonomous driving vehicle via a detour route that bypasses the predetermined assistance location;

the assistance contents include an assistance period that is required to perform the remote assistance; and the assistance method comprises rerouting of the autonomous driving vehicle via the detour route bypasses the predetermined assistance location in response to a detour period that is required to bypass the predetermined assistance location being shorter than a predetermined assistance period that is included in the predetermined assistance contents, and wherein:

the autonomous driving vehicle is controlled to resume autonomous traveling based on the remote assistance provided by the operator;

the assistance contents include an assistance time at which the remote assistance is performed; and the assistance method does not comprise rerouting via a detour route that bypasses the predetermined assistance location when a predetermined resolution period has elapsed from a predetermined assistance time that is included in the predetermined assistance contents.

* * * * *